US010643456B2

(12) United States Patent
King

(10) Patent No.: US 10,643,456 B2
(45) Date of Patent: May 5, 2020

(54) ALARM SYSTEM

(71) Applicant: Rudolf King, Altenstadt (DE)

(72) Inventor: Rudolf King, Altenstadt (DE)

( * ) Notice: Subject to any disclaimer, the term of this patent is extended or adjusted under 35 U.S.C. 154(b) by 0 days.

(21) Appl. No.: 15/744,099

(22) PCT Filed: Jul. 18, 2016

(86) PCT No.: PCT/EP2016/067058
§ 371 (c)(1),
(2) Date: Jan. 12, 2018

(87) PCT Pub. No.: WO2017/013064
PCT Pub. Date: Jan. 26, 2017

(65) Prior Publication Data
US 2018/0204446 A1    Jul. 19, 2018

(30) Foreign Application Priority Data
Jul. 18, 2015    (DE) .................... 20 2015 005 019 U

(51) Int. Cl.
*G08B 23/00* (2006.01)
*G08B 25/01* (2006.01)
(Continued)

(52) U.S. Cl.
CPC .......... *G08B 25/016* (2013.01); *G08B 21/02* (2013.01); *G08B 21/04* (2013.01);
(Continued)

(58) Field of Classification Search
CPC ...... G08B 25/016; G08B 21/02; G08B 21/04; G08B 21/0407; G08B 21/0438;
(Continued)

(56) References Cited

U.S. PATENT DOCUMENTS 5,228,449 A * 7/1993 Christ ................ A61B 5/02433
600/504
10,009,577 B2 * 6/2018 Naidoo .................... H04N 7/14
(Continued)

FOREIGN PATENT DOCUMENTS

CN    1338243 A    3/2002
CN    2868184 Y    2/2007
(Continued)

OTHER PUBLICATIONS

International Search Report of PCT Patent Application No. PCT/EP2016/067058 dated Oct. 14, 2016.
(Continued)

*Primary Examiner* — Zhen Y Wu
(74) *Attorney, Agent, or Firm* — Panitch Schwarze Belisario & Nadel LLP

(57) ABSTRACT

An alarm system comprises at least one sensor device and a remote server; wherein the sensor device comprises at least one sensor which provides sensor data; and a sensor module which is adapted to transmit the data independently and directly to the remote server, wherein the data are only evaluated in the server, without or without storage of the data and the server triggers an alarm, if the sensor data exceed a predetermined threshold value.

11 Claims, 1 Drawing Sheet

(51) Int. Cl.
| | |
|---|---|
| *G08B 21/02* | (2006.01) |
| *G08B 25/00* | (2006.01) |
| *G08B 25/08* | (2006.01) |
| *G08B 21/04* | (2006.01) |
| *H04M 1/725* | (2006.01) |
| *H04W 4/90* | (2018.01) |

(52) U.S. Cl.
CPC ..... *G08B 21/0407* (2013.01); *G08B 21/0438* (2013.01); *G08B 21/0461* (2013.01); *G08B 21/0476* (2013.01); *G08B 25/002* (2013.01); *G08B 25/009* (2013.01); *G08B 25/08* (2013.01); *H04M 1/72538* (2013.01); *H04W 4/90* (2018.02); *H04M 2250/12* (2013.01)

(58) Field of Classification Search
CPC ............ G08B 24/0461; G08B 21/0476; G08B 25/002; G08B 25/009; G08B 25/08; H04W 4/90; H04M 1/72538; H04M 2250/12
USPC ....................................................... 340/573.1
See application file for complete search history.

(56) References Cited

U.S. PATENT DOCUMENTS

| | | | | |
|---|---|---|---|---|
| 2003/0212311 | A1* | 11/2003 | Nova | A61N 1/37258 600/300 |
| 2006/0071797 | A1* | 4/2006 | Rosenfeld | G06Q 10/10 340/573.1 |
| 2006/0154642 | A1* | 7/2006 | Scannell, Jr. | A01G 9/02 455/404.1 |
| 2007/0064109 | A1* | 3/2007 | Renkis | G08B 13/19615 348/159 |
| 2008/0269673 | A1* | 10/2008 | Butoi | A61M 5/14244 604/67 |
| 2009/0027493 | A1* | 1/2009 | Amar | F41G 3/04 348/77 |
| 2009/0113500 | A1* | 4/2009 | Frenkel | H04N 5/232 725/109 |
| 2009/0161787 | A1* | 6/2009 | Singh | H04M 1/72536 375/295 |
| 2009/0186596 | A1 | 7/2009 | Kaltsukis | |
| 2009/0305744 | A1* | 12/2009 | Ullrich | H04M 1/72569 455/567 |
| 2009/0322513 | A1* | 12/2009 | Hwang | A61B 5/02055 340/539.12 |
| 2010/0069731 | A1* | 3/2010 | Harra | A61B 5/05 600/365 |
| 2011/0136463 | A1* | 6/2011 | Ebdon | G01C 21/20 455/404.1 |
| 2011/0196218 | A1* | 8/2011 | Nomura | A61B 5/1411 600/365 |
| 2011/0242317 | A1* | 10/2011 | Wengrovitz | H04N 7/181 348/143 |
| 2011/0274254 | A1* | 11/2011 | Park | H04Q 9/02 379/40 |
| 2013/0044232 | A1* | 2/2013 | Zhang | H04N 5/23203 348/211.99 |
| 2013/0231077 | A1* | 9/2013 | Cahill | G08B 25/008 455/404.2 |
| 2014/0052464 | A1* | 2/2014 | Ray | G06F 19/3418 705/2 |
| 2014/0180877 | A1* | 6/2014 | Dotolo | G06Q 30/0631 705/26.64 |
| 2014/0249393 | A1 | 9/2014 | Proud | |
| 2014/0327540 | A1* | 11/2014 | Shin | G08B 21/0446 340/539.11 |
| 2015/0068069 | A1 | 3/2015 | Tran et al. | |
| 2015/0099953 | A1* | 4/2015 | Baker, Jr. | A61B 5/14552 600/324 |
| 2015/0182799 | A1* | 7/2015 | Chen | A61B 5/11 482/4 |
| 2015/0244989 | A1* | 8/2015 | Liao | G08B 13/19645 348/159 |
| 2015/0269745 | A1* | 9/2015 | Klimer | G06T 7/194 382/103 |
| 2015/0269835 | A1* | 9/2015 | Benoit | G08B 25/016 340/539.13 |
| 2015/0279187 | A1* | 10/2015 | Kranz | G08B 21/0415 340/539.12 |
| 2015/0289823 | A1* | 10/2015 | Rack-Gomer | G16H 40/63 600/365 |
| 2015/0309535 | A1* | 10/2015 | Connor | G06F 1/163 361/679.03 |
| 2016/0019360 | A1* | 1/2016 | Pahwa | G06F 19/3418 705/3 |
| 2016/0019428 | A1* | 1/2016 | Renner | G06K 9/00771 382/195 |
| 2016/0088136 | A1* | 3/2016 | Di Donato | H04M 1/21 600/365 |
| 2016/0287184 | A1* | 10/2016 | Diebold | A61B 5/0022 |
| 2019/0008467 | A1* | 1/2019 | Averina | A61B 5/746 |

FOREIGN PATENT DOCUMENTS

| | | |
|---|---|---|
| CN | 101690657 A | 4/2010 |
| CN | 102005111 A | 4/2011 |
| CN | 203970365 U | 12/2014 |
| DE | 202005000310 U1 | 2/2006 |
| WO | 2014013275 A2 | 1/2014 |
| WO | 2014170081 A1 | 10/2014 |

OTHER PUBLICATIONS

Office Action dated Feb. 20, 2019 in CN Application No. 201680045724.5.

Office Action dated Jun. 25, 2019 in CN Application No. 201680045724.5.

\* cited by examiner

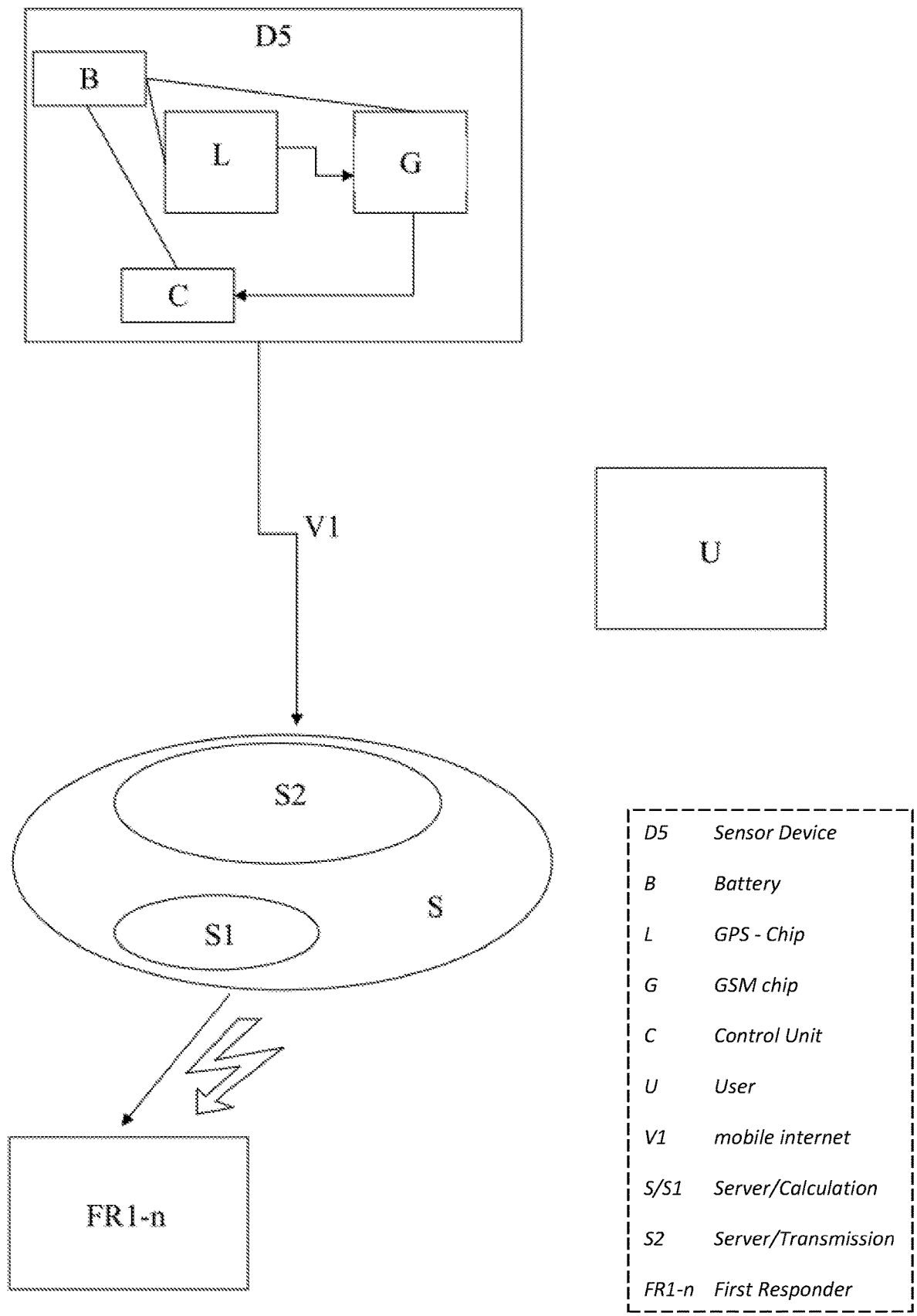

ALARM SYSTEM

CROSS REFERENCE TO RELATED APPLICATIONS

The present application is a National phase Application of PCT Application No. PCT/EP2016/067058 filed on Jul. 18, 2016, which claims the benefit of German Patent Application No. 20 2015 005 019.0 filed on Jul. 18, 2015. All the above are hereby incorporated by reference.

BACKGROUND

Field of the Invention

The present invention relates to an alarm system and in particular a personal safety system (PERS—personal emergency response systems).

Description of the Prior Art

Description of the Problem

The industry of personal safety systems (PERS—personal emergency response systems) is growing worldwide as a result of the development of ageing and so-called overageing of society with growth rates of up to 15% per year.

PERS are functions which are particularly intended to help old and independent persons summon aid rapidly in the case of an emergency. In this case, there are functionalities which are triggered manually and those which are triggered by sensors, primarily fall sensors. In the case of an alarm, either a call centre or the operator or provider or other persons are informed usually by landline or mobile telephone connection or by independent radio systems at dedicated frequencies.

The usual PERS devices available since 1980 are independent devices which the user wears on his body and which
  either provide a radio connection to a device which is
    connected to a landline telephone
  Or
  devices which via radio or mobile phone connection set up contact to a call centre or in another configuration to the social emergency network of the user (SEN) (mobile PERS/mPERS).
  A distinction is made between
  normal personal safety systems which are worn without specific cause
  And
  those which are used in particular in hospitals post-hospital, i.e. after discharge from hospital for temporary monitoring of a patient;

Some systems in some cases use several functionalities of smartphones, there in particular the gyrometers, the GPS chip, possibly cameras, touchscreen and the telephone connection; they are usually designated appropriately as the genre mPERS.

They all have in common that triggering is accomplished by the main device which has at least one transmission possibility, whether this be connection to a normal landline, to an own, usually exclusive, radio network—particularly in the case of military PERS for soldiers, in some countries to radio frequencies specially reserved for this or to the normal so-called mobile phone network and the alarm frequency is sent out along with information from the device.

In a typical case the alarm frequency of a PERS/mPERS is sent with the following contents:

the last measured or current location of the user,
  the personal identification
  as well as the identification, radio frequency or telephone number at which the user can be reached; in some PERS the reason for the alarm—self-triggering by the user, triggering by the fall sensor or by a biometric sensor as a result of falling below or exceeding a value preset for the user or generally—is transmitted automatically or with the assistance of the user.

Usually the information is sent to a call centre which initiates further steps. In further developed devices, this information is sent to various preset recipients; this function is then designated as SEN—social emergency network.

US 2014/327540 A1 discloses a personal emergency alarm system which is implemented with a portable device comprising a transceiver which is configured to communicate with a device management centre, a first and a second sensor which monitor a state and a position of the portable device and a processor which is connected to the sensors and the transceiver.

Problem of the Existing Methods

The existing devices and methods suffer from several problems and inconveniences:

1. All the calculations are made in the device which even with the highest-quality mobile phones and software now on the market brings with it restrictions both as far as the quantity of data and also the calculation scope is concerned.

2. It is not possible to connect equipment short-term, i.e. for example special measuring devices. When, for example, the action mode of a user changes, such as after getting up the transition to normal movement or on transition from normal daily movement to sport, in particular putting on sport chest belts for measurement of cardiac frequency. Measuring devices for bicycles which in addition to speed, can register a fall or impact, accident detectors in automobile et al., these must be connected to the main device.

3. In the mPERS devices and in their software, no automated modification takes place after a perceived or measured state of the user or after new findings which are determined from outside.

Thus, in the case of a diabetic, the last determined value cannot be automatically or manually entered online and therefore the evaluation of the measurement of other values such as, for example, blood fat values modified; an altitude difference of 1000 metres is not automatically used so that no modification of the emergency limits is made in the case of the blood oxygen saturation i.e. partial pressure (SpO2) although the altitude can be measured very easily by navigation devices or altitude meters.

A new approach from Philips since the beginning of 2015 is to determine algorithmically an estimate as to whether a new alarm can be expected again from a plurality of alarms already triggered earlier and the data stored for the person. However this assumes a number of at least one earlier triggering and is accordingly used in preferably severely ill patients with a history of numerous emergencies in a year and negatively to assist a doctor in predicting when a discharge from hospital should be advised after a treatment because of minimizing the probability of a relapse and therefore costly re-admissions, which are associated with contractual penalties for the hospital from American insurance companies. In addition to the required data quantities via the user, called "big data", this method also assumes that the next alarm will be triggered by a similar or same type of event. The system would therefore not be able to assist if after an operation or treatment to the heart, the victim suffers a gall bladder occlusion, and is no better than normal commercially available PERS/mPERS in basically healthy persons and in cases of accidents.

4. An externally found data set is not transmitted in order to help distinguish the emergency limits; if for example new laboratory values of the user are or become available—this can takes place days or even some weeks after taking blood—or sensors pick up a particular value which indicates a higher or lower attentiveness and probability for an emergency even if this is not directly related to the person— for example a rapid increase in the air pollution in a region—this is not implemented in the PERS/mPERS devices.

5. a) mPERS and PERS devices at the present time still focus all the values necessary or transmitted for the alarm in a device and a complex software; thus, typically the connection of a sensor takes place in the same device as the GPS chip, the gyrometer, and loudspeaker and microphone with which contact is made after triggering and a GPRS module with which this information is sent jointly. The complexity has the result that a problem in a part of the device can result in a total crash of the system even if these values are not absolutely mutually dependent or as seen under 4. supplement each other.

b) In the case of mPERS in smartphones, other parts of the hardware, the software which are used for the mPERS or also software viruses and other malware can result in crashing of the device with the result that the entire functionality of the PERS/mPERS is temporarily suspended. In a special case as a result of extensive telephoning, even the battery B can become too weak to execute computing operations for the mPERS, especially if sensor data are to be administered and ascribed.

A completely fail-safe and crash-proof device is desired. With the arrangement described hereinafter it is possible that suspending or failing or switched-on [sic] systems do not put the entire complex, i.e. the entire PERS functionality out of operation; if therefore a heart belt is no longer worn, it nevertheless makes sense that the fall sensors can still trigger an alarm when the remainder of the functions remain ready.

c) In existing devices a radio connection must exist between device and external sensor or switch. In order to save energy, Bluetooth can readily be used instead of WLAN which is economical and provided with low energy density so that the radio contact can rapidly be lost.

6. In addition to the size and lack of handiness of the alarm devices, there is the problem that together with the aforesaid, in the case of triggering the alarm, a very large amount of data must be transmitted at once which in cases of small bandwidth, i.e. usually in cases of poor transmitting and receiving signal, can contribute to delays in the transmission, particularly when very large amounts of data such as a 6-point ECG are to be transmitted.

7. In order to prevent violent crimes—in addition to geriatrics and military and police applications, a third growing market for PERS—users with existing systems are instructed to take the device/smartphone in the hand in dangerous situations and show clearly as a deterrent and at the same time have handy.

In the case of surprise attacks however, this is unfortunately far from the reality, a mobile phone lying in a ladies handbag is so useless for triggering an alarm. Some manufacturers are therefore marketing arm bands or neck chains with concealed switches, actually intended and developed for senior citizens at home which are connected by means of Bluetooth to the transmitter of each kind. This nevertheless means logically that a radio connection must exist (see 6.). In cases of domestic violence or the frequent case of rapes in student residences ("frat house rapes"), however there is usually a distance between the switch worn on the body of the potential victim and the device which possibly lies in a pocket or in the coat. The triggering process thus becomes a game of chance.

8. In some users it can occur specifically if a smartphone use is involved, that these are used in a time-delayed manner; take the case of an active manager: he uses a company mobile phone throughout the day but a private mobile phone on the way to and from home which he finally exchanges for a special sport mobile phone which is better protected from spray water and impact in order to indulge in an extreme sport such as mountain biking. When considered for itself, the mPERS software today should be so far matched to one another that the transition from one device to another should take place smoothly, in particular the personal data need not be entered three times. However, if the user now uses at least one other external device such as an external camera or a pulse meter or an arm band with fall sensor, each smartphone or alarm device can image and identify the independent functionality of this additional device, that for example the pulse belt is switched on and at the same time a connection is identified and set up between the respective smartphone and the at least one sensor and/or device.

9. Most devices record specific values only up to the alarm or only for so long after the alarm until the data set "alarm string" has left the device. However, it can be important to further determine and transmit in order to keep the emergency services updated; thus, for example, in cases of abduction, not only the location of the abduction is important but also the further distance to the location to which the victim is taken or should be taken against his will.

Solution Approach

A method is described in which various devices and sensors are either connected together as required or in a modification of the method after use,
the evaluation and alarm sequences is or are carried out externally, not in the, or by means of, the device and
as a consequence of this method and arrangement of the devices, in cases of partial loss of function or intentional switch-off of one device, the measurements and the potential of the alarm triggering are not impaired overall.

BRIEF SUMMARY

In one embodiment, an alarm system, in particular a personal emergency response system, comprising at least one sensor device and a remote server are provided. The sensor device comprises at least one sensor which provides sensor data and a transmission module which is adapted to transmit the data independently and directly to the remote server, wherein the data are only evaluated in the server, with or without storage of the data, wherein the sensor data is only evaluated in the server and the server triggers an alarm, if the sensor data exceed a predetermined threshold value.

In one embodiment, the at least one sensor of the at least one sensor device is selected from a group consisting of a camera, an ECG sensor, a blood pressure sensor, a blood sugar sensor, am SpO2 sensor, a tilt sensor, a fall sensor, an acceleration sensor and a thermometer.

In one embodiment, the alarm system further comprises a device which enables the manual triggering of an alarm at the server by a user.

In one embodiment the transmission module further transmits a user identification of a user to the server.

In one embodiment the system comprises two or more sensor devices and an alarm is triggered if two or more sensor devices deliver sensor data which exceed a second predetermined threshold value of the respective sensor device, wherein the second threshold value differs from the first threshold value or these influence one another.

In one embodiment the alarm triggers a notification of at least one party which is selected from the group consisting of first responder, family of the user, friend of the user or a call centre.

In one embodiment the alarm system further comprises a position sensor, preferably a GPS sensor, which transmits position data to the server.

In one embodiment the alarm triggers a notification of third persons who are located within a radius of action known in the same way to the server around the position of the user.

In one embodiment the radio connection module is adapted to use at least one mobile radio standard to transmit the sensor data to the server, wherein the mobile radio standard is preferably selected from the group consisting of standard of a public radio network, standard of the local mobile radio network, GSM, GPRS, Edge UMTS, HSDPA, HSPA+, LTE and LTE Advanced.

In one embodiment the at least one sensor device further comprises a near-range radio module in order to transmit the sensor data optionally via a local network access and the network to the server, wherein the near-range radio module is adapted to use at least one near-range radio standard and wherein the near-range radio standard is preferably selected from the group consisting of Bluetooth, IEEE 802.11 and IEEE 802.11a, ac, ad, b, g, h or n.

In one embodiment the transmission module of the sensor device is a one-way transmission system. The transmission module is a unidirectional module, i.e. information is only transmitted without any form of acknowledgement by a recipient. In one embodiment the transmission module is accordingly only suitable for transmitting information and not for receiving enquiries or instructions which are created by the receiver of the sensor data. The sensor device transmits sensor information so to speak "blind" without finding out whether the data are received.

In one embodiment the sensor data are transmitted in encrypted form. Preferably the ID of the user which is for example preset or noted in the software by means of software-implemented settings (e.g. by means of USB connection to the user device PC, mobile telephone etc.) is used to encrypt the sensor data.

In one exemplary embodiment, an alarm system, in particular a personal emergency response system, comprising at least one sensor device and a remote server are provided, wherein the sensor device comprises at least one sensor which provides sensor data and a transmission module which is adapted to transmit the data independently and directly to the remote server, wherein the sensor data are only evaluated in the server and the server triggers an alarm, if the sensor data exceed a predetermined threshold value.

In one embodiment the transmission module is only suitable for transmitting information and not for receiving enquiries or instructions which are provided by the receiver of the sensor data.

In one embodiment the sensor, i.e. for example a switch or another device can receive commands for the status change of the measurement and/or transmission.

In one embodiment a video camera is provided which can transmit data according to the preceding claims.

A method for operating an alarm system according to any one of the preceding embodiments is provided by the present invention, wherein the individual devices, switches and sensors also relay their information after triggering an alarm.

In one embodiment of the method of the invention, as a result of new transmitted data and data received by the server after triggering an alarm sequence, the notified persons receive further communications and/or further persons are notified.

In one embodiment of the method of the invention, data recorded and transmitted by sensors are used individually or in their entirety by the server to form an overall picture of the user in order to change the alarm readiness, in particular if values of the user are transmitted to the server by a third party in ways which do not correspond to the above methods.

In one embodiment of the method of the invention, at the same time as triggering an alarm, the user who has a device with microphone and/or loudspeaker available, is set up a VoIP connection or when using a smartphone, a telephone connection is set up between user and the first responder or responders and/or a call centre and/or third persons.

In one embodiment of the method of the invention, devices, switches and sensor have in addition to the GSM chip, another WLAN and/or Bluetooth chip and by means of WLAN and/or Bluetooth connection instead of and/or in addition to the mobile radio connection to the server, a data connection can be used and in another embodiment there is at the same time a more precise location possibility, or devices, switches and sensor only have one WLAN and/or Bluetooth chip and transmit the data in the said form in the above claims.

In one embodiment of the method of the invention, movement patterns and/or sensors are recorded and matched over a fairly long time by the server and in the case of unexpected deviations, a pre-alarm conversation is set up with the user or an alarm is triggered.

BRIEF DESCRIPTION OF THE DRAWINGS

FIG. 1 shows a schematic view of a preferred embodiment of an alarm system of the present invention.

DETAILED DESCRIPTION

In previous versions the alarm is directly triggered by a PERS/mPERS device, the same device therefore identifies an alarm declared by the user or a sensor, or determines algorithmically the event as worthy of an alarm and then sets up the call and possibly text messages and messages to a call centre or predefined first aider (called first responder/SEN) who can then speak to the user via the same (telephone) system.

The method proposed here provides in contrast that in each case independently, a connection preferably by means of mobile internet (V1), by a GSM chip (G) or another special radio connection sends found data to a server (S/S1) connected to the internet (V1).

each device to be used, potentially a camera with trigger each biosensor, whether this be in each one embodiment an ECG, blood pressure, SpO2 measuring device, any other sensor whether this be in each one embodiment of the method measured on, in or outside the body of the user and in future also in its own, transplanted or artificial body part, which is provided with an IP address, has its own sensors and can transmit data of the sensors, any other device even if this only collects findings which can indirectly impair the sensitivity of the user, potentially a GPS or other geolocation chip L (D5), potentially a gyrometer potentially a switch for manual triggering of an alarm, potentially a fall sensor, potentially a device for detecting accidents, the latter preferably built in or even concealed in an arm band or an item of jewelry or in a cavity in a shoe.

Each unit therefore basically only consists of the GSM chip with antenna, possibly a charging and control unit (C), the rechargeable battery (B), shown for the example of (D5) in FIG. 1.

Software

The information transmitted by the various devices are stored at the server (S/S2)

with identification of the user (U) or in a modification of the invention under the identification of numerous users who form a community—whether this be locally or for some other reason, which is substantiated in the common dependence of some other type of community.

In the event of triggering an alarm, whether this be in one case by manual pressing of the switch by user (U)

or in one embodiment of the method by remote trigging a third party such as a doctor, for user (U), an alarm declaration by a sensor or a device, i.e. transmission of only 0/1

"no alarm vs alarm"

Or in each one alternative by a predefined algorithm for a specific device, for a specific sensor or for a sequence of such, for example, "when the camera is switched on, trigger the alarm"

or for example, "when the body temperature is above 39 degrees or drops below 34 degrees, trigger the alarm", or an algorithmically calculated combination of several measured values transmitted to the server S1 such as for example "if pulse is below 55 beats/min and SpO2 below 93% and body temperature above 37 degrees Celsius, trigger the alarm".

The server (S/S1) now recognizes the alarm and informs in each one modification of the method the call centre or the first responder, family and friend of the user and/or using the geo-location transmitted separately to the server, third persons (FR1-*n*) who could help locally.

The difference from the previous applications lies in the separate transmission to the server (S/S2) and calculation of the alarm in the server (S/S1). In conventional systems the triggering of the alarm and sending of the alarm sequence takes place internally in or from the device and not externally using different types of transmitted values.

The individual devices still transmit their information— i.e. even after triggering—since they cannot "know" and also cannot find out that an alarm has been triggered; in one modification of the method they can also be requested by the server (S/S1) per signal transmitted per mobile internet to send more specific data if they have a receiving module for this and are designed to transmit and/or to measure in different modes. Thus, for the GPS chip (D5) it would make no difference that the use of the functionality of the transmitted data is now no longer proactive, i.e. for preparation of a future alarm but is post-active and therefore can be used to track the user after the alarm.

A 6-point ECG sensor which fundamentally only sends one or two ECG points or even only one pulse value in time intervals can be requested, whether it is because an alarm exists or the server calculates a reason, why a more precise monitoring is required, to send the pulse frequency or the one-point ECG more rapidly or at the same time use the most accurate stage possible to it.

In another embodiment of the invention, data transmitted by sensors can be used individually or in their entirety by the server (S/S1) to enable an entire picture of the user (U); this can result in an increase in the alarm readiness, if in one case, for example, particular sensor values are transmitted which indicate the possibility of a problem or in another case, values of a user found by a third party, a doctor or a medical laboratory are transmitted to the server which generally modify the alarm readiness or even ad hoc indicate an emergency; if therefore it is established post-operatively that certain blood fat values are again in a normal range, the alarm readiness can automatically be reduced without this needing to be notified to the individual devices or this even changing their operating mode; conversely a determination of septic fluids in the blood can be the sole grounds for triggering the alarm immediately; the server recognizes the difference and adapts its values for automatic alarm triggering.

Hardware

Each unit fundamentally only consists of the GSM chip with antenna, possibly a charging and control unit (C), the preferably rechargeable battery (B) shown for the example of (D5) in FIG. 1.

Since the devices as described transmit independently of one another, they are not concerned with calculation algorithms which can impair their function, in particular if the device must execute complex computing operations.

In the purest form of the method there is at least one sensor with GSM chip or other radio or other transmission which transmits to a server if these have stored a reason for triggering.

In one embodiment of the method, at the same time as the triggering of the alarm—if microphone and loudspeaker are available at the user (U) in the specific situation— a VoIP connection or when using a smartphone a telephone connection can be set up between user (U) and the first responder, FR, or responders (FR1-*n*) and/or the call centre and/or other third parties.

In another embodiment of the method, in addition to the GSM chip, the devices and sensors receive another WLAN and/or Bluetooth chip; thus, on the one hand in cases of existing separate secure WLAN connections and in cases of open WLAN connections in the public space, instead of by mobile internet, the data connection can be replaced by the possibly stronger, faster and more secure data connection by means of WLAN, on the other hand in cases of separate WLAN networks there is at the same time a possibility for location (for vertical location in this case see the applicant's patent PCT/EP 2014 055495=WO 2014/170081).

In another embodiment of the method, the devices and sensors only have one WLAN and/or Bluetooth chip each, particularly when these are devices and sensors connected to or for connection to the server (S/S1/S2) which predominantly involves stationary WLAN or WLAN co-moving with them in some areas, such as are used in more modern motor vehicles which have their own WLAN hotspots integrated in them.

Further Developments and Advantages of the Described Method

1. Since the computing operations take place outside the transmission, this arrangement is also suitable for quantities of data incoming simultaneously and can also be reliably used with "big data" when several in particular contradictory data are found. In one embodiment of the invention the server (S) can be divided into a server (S2) which receives and stores data and a server (S1) which retrieves and processes data from these. Thus, there are no problems of computing capacity since these units can be extended and scaled arbitrarily without needing to intervene in the operating mode of the hardware.

2. Since the devices and sensors are not connected to one another but transmit and receive or measure and receive independently of the server (S/S2), no device needs to wait for another or the entire system cannot be impaired because a device or sensor has failed.

3. Newly found values can be transmitted automatically if and insofar as they are available, then compared with the values last found from other sensors—even if these go back a reasonably short time.

In another embodiment it can be determined in the meantime how far these data
- overlap or supplement older data or
- could even be wrong in individual cases and thus should not be taken into account.

4. A delay between finding and transmission is eliminated by the method.

5. If a part of the device, for example GPS measurement is impossible, this does not mean that the device per se no longer provides full capacity since this can have a logical reason, for example entering a building or failure of the sensor. The possibility for triggering the alarm is preserved however.

Likewise in one embodiment of the method it can be detected that the user has now put on an arm band or chest belt or similar device by means of which for example cardiac frequencies can be detected; if he takes this off, this does not mean that he now no longer wishes to use the potential for the PERS alarm but only that the highest probability for heart attack, cardiac infarct etc. no longer exists. If for example the spouse returns to the user, he could press the manual trigger button in the event of a blackout caused by a heart attack so that the user no longer needs to wear the very inconvenient heart belt and can take it off safely; nevertheless even the special PERS function should and must be preserved.

6. Each device considered for itself can be installed in the smallest space; in particular it is possible to think of a portable, preferably minimal size camera, in each case having the capability to transmit data into the mobile internet, which actually only begins to transmit when the trigger is pressed which in a possible arrangement immediately triggers the alarm in the server; here it is possible to think of a use as rape prevention.

A GPS sensor can also be presented which is worn for example in a buckle or in a cavity in a shoe and transmits actively after switching on or only during movement. For example, in the case of abduction, it still transmits undiscovered even when the smartphone has been removed from the victim/user (U).

As a side effect for deterrence it is therefore no longer possible for a criminal to identify whether he has actually begun to secure the crime scene or whether the police are tracking the location of the user online and thus he cannot be at all certain whether, and if yes a victim has this device as user (U), since he cannot identify which information is transmitted since—when he find a mobile phone—he can only see the general PERS on the mobile phone, i.e. typically the trigger button.

In one embodiment of the invention, by means of comparing the movement patterns and/or sensors over a fairly long time interval, it can be identified by the server (S/SI) when unexpected deviations suddenly take place and a pre-alarm conversation with the user (U) or a full alarm are triggered.

In the case of the shoe, in one modification of the invention the software is capable of processing deviations of the GPS data: if GPS data are sent from the shoe, at the same time also from a smartphone, it can occur that suddenly two identical values are separated. Here the system can decide: if the separation takes place in the stored work or living area of the user (U)—for the storing of this data see the patent of the same applicant PCT/EP 2014 055495=WO 2014/170081—he has probably only changed the shoe. On the other hand, if it takes place differently, in particular the GPS moves in the shoe but that from the smartphone remains stationary, the software can identify the urgency; there is a suspicion of theft or abduction, presumably a person has removed the mobile phone from the user either to steal the mobile phone or has discarded it to abduct the person.

7. In order to prevent violent crimes, one—or in one embodiment of the method several—external cameras and/or other concealed devices can be used, which need not necessarily be worn on the body but, for example, can be attached in a jacket pocket or handbag, concealed in a belt buckle and integrated; if a user (U) now has her smartphone with the GPS and/or GPRS location in her handbag, it does not matter if she moves a few metres away from the handbag, possibly several metres away as long as she still wears the camera by means of which she can transmit not only the live stream of events around her but can at the same time trigger the alarm by switching on the camera.

In one embodiment of the method this can also play a part in deployments of soldiers and police in which the positioning should and can be accomplished permanently but the headquarters should only be alerted when for example the camera attached to a weapon or a camera sitting on the body is switched on; at the same time the alarm is then triggered giving the location.

8. Since the devices transmit individually, it no longer matters which device of many is used and the algorithms in the server can uniformly store the collected data and process them at the same time; a connection is no longer required.

In one modification of the invention, individual or several units nevertheless provided with Bluetooth and/or WLAN in radio proximity to the main device transmit the data to this and are transmitted from there. This is primarily used for efficient energy management, particularly when

- the radio connection between the devices uses less energy than the sum of the two individual transmissions because in the latter case the identification only needs to be sent once, and/or
- the energy saving in the device with the weaker battery is severely reduced whereas at the same time the different for the other device with the generally stronger or stronger residual charge is small.

This differs from the patent application PCT/EP 2015/060331 of the same applicant in that in this only the connection between "genuine" smartwatch, smartphone with incorporation of a sensor in the event of the loss of a radio bridge is considered.

9. The triggering of the alarm is no longer brought about by any device, all the devices continue to transmit data regardless and also transit data even after the triggering of the alarm which takes place in the server. The data required and appropriate for the alarm transmission are already stored on the server so that the data volume to be transmitted in an emergency and the required time are severely reduced.

At the same time, a typical conversation to be expected, which takes place after the alarm triggering does not burden the computing capacity of the device.

10. The data volume to be transmitted in each case is also extremely small before the alarm triggering since it only comprises the person identification and the respective data set. In extreme cases, in the case of a sensor or a built-in alarm button, it is actually only a single bit, namely alarm triggered=0 and alarm not triggered=1, in the case of a combination of 2 bits therefore no alarm=00, fall identified=for example 10, switch actuated=01, in each case in addition to the person identification, i.e. a data string to be transmitted of a few bytes.

DEFINITIONS

The term "server" comprises both the specific server and also the so-called cloud. The term "GPS" comprises all geolocation services, i.e. not only the American global positioning system fundamentally and originally dedicated to military purposes ("GPS" in the actual sense) but also other services of the same kind such as in particular the European Galileo System and the Russian Glosnast.

The term PERS designates hereinafter as a generic term all systems used for the transmission of particularly personal emergencies, whether as the main purpose or auxiliary purpose, directly—i.e. for example by sensors which transmit body data—or indirectly—i.e. for example by sensors or recording devices, which are for example integrated in passenger buses and record accidents when these usually also involve at least one potential injury to persons. Unless specified otherwise, no distinction is to be made between PERS and mPERS.

The term server designates not only an internet server but any computer which can receive and store data externally, process and send out alarm messages in any way.

EXAMPLE

In one example of a preferred alarm system of the present invention, a user wears a GPS chip (e.g. in the shoe). This transmits ID+GPS coordinates continuously or at intervals, both are stored at the receiving server. For the GPS signal per se in the server of this embodiment there is no algorithm which could trigger an alarm. In other embodiments however, one or more alarm conditions could be stored for the GPS signal on entering a dangerous or forbidden area (e.g. building site for children, leaving the hospital site for elderly persons needing care).

Now a second sensor signal reaches the server (e.g. from a sensor assigned to the user, i.e. known to the server or completely unknown). For example: SpO2 from ID of the user is 94. The algorithm of the server outputs that this is an alarm case.

The following alarm sequence has already been described by the same inventor in WO 2014/170081.

However, the server of the present invention is not in a position conversely to come in contact with the sensor device of the system according to the invention in order to enquire, for example whether it can supply data (e.g. glucose value, current pulse or disturbance of the heart rhythm). The sensors which can supply data simply supply further data (even if this makes no sense such as in cardiac arrest).

This feature of the embodiment of this example of the present invention does not eliminate the modification in which more precise data are requested since it is not the case that the CPU does not request transmitted data but knows that there is the sensor and it is active although it delivers too poor data which should be better.

In other words, an essential feature of the given example is that there is as it were a "blind" sensor which sends data to the server by mobile internet connection or mobile radio network without any acknowledgement and does nothing with most of the data —unless other data trigger an alarm.

EXEMPLARY EMBODIMENTS

The following embodiments are exemplary and contribute to the understanding of the present invention. All the given properties of the method and the devices can also be implemented with the above-described "blind" sensor and server unless the feature absolutely requires a mutual communication or acknowledgement to the server.

In an exemplary embodiment a method is provided in which a connection between sensors, switches and other devices will be and/or is set up independently by a GSM built into this device or other telephone chips (G) by means of a radio connection, preferably by means of mobile internet (V1) in the normal mobile phone radio network, by means of which preferably telemetric data found or generated in the sensors. switches and other devices with identification of the user (U) and in a modification of the invention with identification of numerous users are sent to a server (S/S1) connected to the internet (V1), used for the purpose of identifying a personal occurrence and/or for the subsequent triggering of a personal alarm without the sensors, switches and devices communicating with each other, receiving acknowledgments and commands from the server and without transmitting the data previously to another device, another node point or another network than the usual radio network.

In the exemplary method the information sent by the various sensors, switches and devices is deposited in the server (S/S2) and stored.

In the exemplary method sensors, switches and devices receive acknowledgements and instructions of the server (S/S1).

In the exemplary method the alarm triggering takes place in the server, by manual pressing of a switch by the user (U) or in one embodiment of the method by remote triggering by a third party for the user (U) or in one embodiment by a sensor or a device or in one embodiment each by a predefined algorithm for a certain device, switch or sensor.

In the exemplary method in the server it is stored in an algorithm which determines that a certain message of one or more or in conjunction of the data of several sensors, switches and devices should be followed by an alarm triggering even when the data itself do not signal an alarm.

In the exemplary method data last and/or previously received and stored is combined in the server (S/S1) and corresponding alarm and notification of a call centre and/or of the social emergency network such as preferably family and friends of the user (U) which are all stored in the server.

In the exemplary method, using the geo-location transmitted separately to the server by the user and other persons third parties (FR1-n) who could help locally are alerted by the server.

An exemplary camera with trigger can transmit the data by the above method.

An exemplary biosensor, preferably an ECG, blood pressure, SpO2 measuring device can transmit data by the above method.

An exemplary sensor system which has its own sensors on, in or outside the body of the user and also in its own transplanted or artificial body part, can transmit data of the sensors according to the above method.

Such an exemplary device which collects findings which can indirectly impair the state of the user, preferably GPS or other geolocation chips, a gyrometer, switch for manual triggering of an alarm, fall sensor, device for detecting accidents, preferably built-in or concealed in an arm band or piece of jewelry or in a shoe, preferably in a cavity, wherein the findings can be transmitted according to the above method.

In the exemplary method the individual devices, switches and sensors relay their information further after triggering of an alarm by the server.

In the exemplary method, sensors, switches and devices receive return confirmations and instructions of the server (S/S1), in particular preferably transmitted from this by radio by mobile internet are requested to send more specific data.

In the exemplary method as a result of new transmitted and received data after triggering an alarm sequence, the notified persons receive further notifications and/or further persons are notified.

In the exemplary method preferably telemetric data transmitted by sensors are used individually or in their entirety by the server (S/S1) to form a complete picture of the user U, preferably to modify the alarm readiness, in particular if values of the user are transmitted to the server by third parties in ways which do not correspond to the above method.

In the exemplary method at the same time as triggering an alarm, the user who has a device with microphone and/or loudspeaker available, is set up a VoIP connection or when using a smartphone, a telephone connection is set up between user (U) and the first responder or responders and/or a call centre and/or third persons.

In the exemplary method devices, switches and sensor have in addition to the GSM chip, another WLAN and/or Bluetooth chip wherein by means of WLAN and/or Bluetooth connection instead of and/or in addition to the mobile radio connection to the server, a data connection can be used and in another embodiment there is at the same time a more precise location possibility.

In an exemplary embodiment devices, switches and sensors only have one WLAN and/or Bluetooth chip and data are transmitted in the above-described method.

In the exemplary method a matching of movement patterns and/or sensors is detected over a fairly long time by the server (S/S1) and when unexpected deviations suddenly occur, a pre-alarm conversation is set up with the user or a full alarm is triggered.

The invention claimed is:

1. A personal emergency response system, comprising at least two sensor devices; and
   a remote server;
   wherein each of the at least two sensor devices respectively comprises: at least one sensor which provides sensor data; and
   a transmission module which is adapted to use at least one mobile radio standard to transmit the sensor data directly, via the at least one mobile radio standard, to the remote server, wherein the mobile radio standard is selected from the group consisting of standard of a public radio network, standard of the local mobile radio network, Global System for Mobile Communications (GSM), General Packet Radio Service (GPRS), Edge Universal Mobile Telecommunication System (UMTS), High Speed Downlink Packet Access (HSDPA), High Speed Packet Access (HSPA+), Long Term Evolution (LTE), and LTE Advanced,
   wherein the transmission module is further adapted to transmit the sensor data to the remote server, wherein the sensor data are only evaluated in the remote server, and the remote server triggers an alarm if the sensor data exceed a respective first predetermined threshold value corresponding to a respective one of the at least two sensor devices and if the at least two sensor devices deliver sensor data which exceed respective second predetermined threshold values corresponding to the respective sensor devices, wherein the respective second predetermined threshold values differ from the respective first predetermined threshold values, wherein the transmission module of a respective one of the at least two sensor devices is a one-way transmission system and the at least two sensor devices are only suitable for transmitting information and not for receiving enquiries or instructions created by the remote server;
   wherein the at least one sensor of each respective one of the at least two sensor devices is selected from a group consisting of an electrocardiogram (ECG) sensor, a blood oxygen saturation (Sp02) sensor, a tilt sensor, a fall sensor, an acceleration sensor, and a switch which enables manual triggering of an alarm at the remote server by a user.

2. The alarm system according to claim 1, wherein the respective transmission modules further respectively transmit a user identification of a user to the remote server.

3. The alarm system according to claim 1, wherein the alarm triggered by the remote server triggers a notification of at least one party which is selected from the group consisting of first responder, family of a user, friend of the user or a call center.

4. The alarm system according to claim 3, wherein the alarm triggered by the server triggers a notification of third persons who are located within a radius of action around the position of a user.

5. The alarm system according to claim 1, further comprising a global positioning system (GPS) sensor, which transmits position data to the remote server.

6. A method of operating a personal emergency response system, the personal emergency response system comprising a remote server and at least two sensor devices, respectively comprising at least one sensor to provide sensor data and a transmission module which uses at least one mobile radio standard to transmit the sensor data directly, via the at least one mobile radio standard, to the remote server, wherein the mobile radio standard is selected from the group consisting of standard of a public radio network, standard of the local mobile radio network, Global System for Mobile Communications (GSM), General Packet Radio Service (GPRS), Edge Universal Mobile Telecommunication System (UMTS), High Speed Downlink Packet Access (HSDPA), High Speed Packet Access (HSPA+), Long Term Evolution (LTE), and LTE Advanced, the method including:

transmitting, by the respective transmission modules of the at least two sensor devices, the sensor data provided by the respective at least one sensor of the at least two sensor devices to the remote server, evaluating the sensor data transmitted to the remote server only in the remote server, and triggering an alarm by the remote server if the sensor data transmitted by a respective one of the at least two sensor devices exceed a respective first predetermined threshold value and if the at least two sensor devices deliver sensor data which exceed respective second predetermined threshold values corresponding to the respective sensor devices, wherein the respective second predetermined threshold values differ from the respective first threshold values;

wherein the transmission modules of the at least two sensor devices are one-way transmission systems and the at least two sensor devices are only suitable for transmitting information and not for receiving enquiries or instructions created by the remote server receiving the sensor data, wherein the at least one sensor of a respective one of the at least two sensor devices is selected from a group consisting of an electrocardiogram (ECG) sensor, a blood oxygen saturation (SpO2) sensor, a tilt sensor, a fall sensor, and an acceleration sensor, and wherein the at least two sensor devices keep relaying information after triggering the alarm.

7. The method according to claim 6, wherein the alarm triggered by the remote server triggers a notification of third persons who are located within a radius of action around the position of a user, wherein as a result of new transmitted remote sensor data and data received by the remote server after triggering an alarm sequence, the notified third persons receive further communications and/or further persons are notified.

8. The method according to claim 6, further including using sensor data recorded and transmitted by the at least one sensor of at least one of the at least two sensor devices by the remote server to form an overall picture of a user in order to change the alarm readiness.

9. The method according to claim 8, wherein at the same time as triggering an alarm by the remote server, a user who has a device with microphone and/or loudspeaker available, is set up a voice over Internet Protocol (VoIP) connection or when using a smartphone, a telephone connection is set up between the user and a first responder or responders and/or a call center and/or third persons.

10. The method according to claim 8, wherein the at least one sensor device of at least one of the at least two sensor devices includes an additional wireless local area network (WLAN) and/or Bluetooth chip and by means of WLAN and/or Bluetooth connection, in addition to the mobile radio connection to the remote server, a data connection is enabled to be used or there is at the same time a more precise location possibility, or, alternatively, devices, switches and sensors only have one WLAN and/or Bluetooth chip and transmit respective sensor data.

11. The method according to claim 8, wherein movement patterns and/or sensor data are recorded and matched over a time interval by the remote server and in a case of unexpected deviations, a pre-alarm conversation is set up with the user or an alarm is triggered.

* * * * *

UNITED STATES PATENT AND TRADEMARK OFFICE
CERTIFICATE OF CORRECTION

PATENT NO. : 10,643,456 B2
APPLICATION NO. : 15/744099
DATED : May 5, 2020
INVENTOR(S) : Rudolf King It is certified that error appears in the above-identified patent and that said Letters Patent is hereby corrected as shown below:

On the Title Page

Item (57), in the antepenultimate line of the Abstract, "without or without" should read --with or without--

Signed and Sealed this
Twentieth Day of October, 2020

Andrei Iancu
*Director of the United States Patent and Trademark Office*